United States Patent [19]

Sutton et al.

[11] Patent Number: 4,477,644

[45] Date of Patent: Oct. 16, 1984

[54] REACTION INJECTION MOLDED POLYURETHANES EMPLOYING THIAPOLYCYCLIC POLYAHLS AS CHAIN EXTENDERS

[75] Inventors: Tonja R. Sutton; David W. Hughes, both of Midland, Mich.

[73] Assignee: The Dow Chemical Company, Midland, Mich.

[21] Appl. No.: 520,980

[22] Filed: Aug. 8, 1983

[51] Int. Cl.$^3$ ............... C08G 18/14; C08G 18/00
[52] U.S. Cl. ................................. 528/73; 264/54; 264/328.2; 264/331.12; 264/331.19; 521/127; 521/128; 521/166; 549/9; 549/23; 549/49
[58] Field of Search ............ 549/9, 23, 49; 528/73; 264/328.2; 521/127, 128, 166

[56] References Cited

U.S. PATENT DOCUMENTS

| | | | |
|---|---|---|---|
| 3,644,415 | 2/1972 | Weil et al. | 260/327 |
| 3,666,788 | 5/1972 | Rowton | 260/465.5 R |
| 4,269,945 | 5/1981 | Vanderhider et al. | 521/159 |

FOREIGN PATENT DOCUMENTS

| | | |
|---|---|---|
| 863223 | 2/1971 | Canada . |
| 1534258 | 11/1978 | United Kingdom . |

*Primary Examiner*—Herbert S. Cockeram
*Attorney, Agent, or Firm*—Michael S. Jenkins

[57] ABSTRACT

Reaction injection moldings (RIM) having increased heat resistance are provided by employing a thiapolycyclic polyahl such as dimethyl-9-thiabicyclononane diamine as a chain extender in an otherwise conventional RIM formulation.

20 Claims, No Drawings

REACTION INJECTION MOLDED POLYURETHANES EMPLOYING THIAPOLYCYCLIC POLYAHLS AS CHAIN EXTENDERS

BACKGROUND OF THE INVENTION

This invention relates to reaction injection molded polymer polyurethanes which are prepared using polyahls chain extenders.

Reaction injection molded polyurethanes are well-known in the art as described by F. Melvin Sweeney in *Introduction to Reaction Injection Molding*, Technomics, Inc., 1979. The use of reaction injection molding (RIM) of polyurethanes in the production of structural parts for automotive applications such as fenders, doors and body panels as well as in other applications such as computer housings, office equipment housings, sports equipment and the like is well-known.

In the practice of RIM processes to produce a molding having a compact surface skin, a mold is filled with a highly reactive, liquid starting component within a very short time by means of a high output, high pressure dosing apparatus after the components have been mixed in so-called positively controlled mixing heads. In such "one-shot" processes, the highly reactive starting materials which are generally a polyether or a polyester having a plurality of active hydrogen moieties, a polyisocyanate and a chain extender such as a diol or a polyamine as well as other conventional additives such as blowing agents, catalysts, fillers and the like, are delivered mechanically within a very short time (generally from 2 to 4 seconds) and mixed at the same time and introduced into the mold in which the mixture is cured to yield the finished product within a time (generally from 1 to 2 minutes) and thereby produce a polyurethane product. The polyurethane-forming compositions have been the material of choice for RIM applications due to their short reaction times and easy handling which thereby allows rapid cure and short cycle times. Unfortunately, such formulations often do not have sufficient temperature resistance to withstand paint curing conditions employed by the automotive industry without deformation. While such deficiencies arising from low temperature resistance of finished parts have been overcome to some extent by the use of various diamines as chain extenders instead of diols, such amines are often highly reactive thus leading to premature cure prior to the filling of the mold. In addition, even further increase in temperature resistance of the resulting RIM part is desired for many applications which could otherwise advantageously employ RIM structural parts.

In view of the foregoing deficiencies of conventional RIM formulations, it would be highly desirable to provide a formulation which can be introduced into the mold without significant premature curing and which yields a finished molded article capable of withstanding temperatures as high as 325° F. while retaining original dimensions and physical properties.

SUMMARY OF THE INVENTION

The present invention is, in one aspect, such a reaction injection molding (RIM) formulation comprising a non-thiacyclic polyahl, a thiapolycyclic polyahl, a polyisocyanate and a urethane catalyst in proportions such that upon subjecting the formulation to conditions of a conventional RIM process, a useful RIM article is formed.

In another aspect, this invention is a process for the production of a RIM polyurethane article which comprises subjecting in a one-shot procedure the RIM formulation to conditions sufficient to form a reaction injection molding.

In a final aspect, the present invention is the reaction injection molded article resulting from the practice of the aforementioned process in the form of a foam or a solid article.

Surprisingly, the thiapolycyclic polyahls employed as the chain extenders in the practice of the present invention contribute significantly to the structural rigidity and temperature resistance of the resulting molded part, but exhibit reduced reactivity sufficient to avoid significant amounts of premature curing. For the purposes of this invention, premature curing means that the highly reactive formulation cures prior to complete filling of the mold with the formulation.

The various aspects of the present invention are particularly useful in the preparation of various automotive parts such as structural parts including fenders, doors, quarter panels and the like as well as in the manufacture of computer housings, office equipment housings, sports equipment and many other applications where RIM processes have hereinbefore been employed.

DETAILED DESCRIPTION OF REPRESENTATIVE EMBODIMENTS

The non-thiacyclic polyahl suitably employed in the practice of this invention includes any organic compound having (1) at least two active hydrogen moieties, (2) a number average molecular weight ($M_n$) of at least 60, and (3) no thiacyclic moiety or thiapolycyclic moiety. Preferably, the polyahl is a polymer having an $M_n$ of at least 200 and at least three repeating units of a monomeric moiety. For the purposes of this invention, an active hydrogen moiety refers to a moiety containing a hydrogen atom which, because of its position in the molecule, displays significant activity according to the Zerewitnoff test described by Woehler in the *Journal of American Chemical Society*, Vol. 49, page 3181 (1927). Illustrative of such active hydrogen moieties are —COOH, —OH, —NH$_2$, —NH—, —CONH$_2$, —SH and —CONH—. Typical non-thiacyclic polyahls include polyols, polyamines, polyamides, polymercaptans and polyacids.

Of the foregoing non-thiacyclic polyahls, the polyols are preferred. Examples of such polyols are the polyol polyethers, the polyol polyesters, hydroxy functional acrylic polymers, hydroxyl-containing epoxy resins, polyhydroxy terminated polyurethane polymers, polyhydroxyl-containing phosphorus compounds and alkylene oxide adducts of polyhydric thioethers including polythioethers, acetals including polyacetals, aliphatic and aromatic polyols and thiols including polythiols, ammonia and amines including aromatic, aliphatic and heterocyclic amines including polyamines as well as mixtures thereof. Alkylene oxide adducts of compounds which contain two or more different groups within the above-defined classes may also be used such as amino alcohols which contain an amino group and a hydroxyl group. Also alkylene adducts of compounds which contain one —SH group and one —OH group, as well as those which contain an amino group and a —SH group, may be used.

Polyether polyols which are most advantageously employed as the non-thiacyclic polyahl in the practice of this invention are the polyalkylene polyether polyols including the polymerization products of alkylene oxides and other oxiranes with water or polyhydric alcohols having from two to eight hydroxyl groups. Exemplary alcohols that are advantageously employed in making the polyether polyol include ethylene glycol, 1,3-propylene glycol, 1,2-propylene glycol, 1,4-butylene glycol, 1,3-butylene glycol, 1,2-butylene glycol, 1,5-pentane diol, 1,7-heptane diol, glycerin, 1,1,1-trimethylolpropane, 1,1,1-trimethylolethane, hexane-1,2,6-triol, α-methyl glucoside, pentaerythritol, erythritol, pentatols and hexatols. Also included within the term "polyhydric alcohol" are sugars such as glucose, sucrose, fructose and maltose as well as compounds derived from phenols such as 2,2-(4,4'-hydroxyphenyl)-propane, commonly known as bisphenol A. Illustrative oxiranes that are advantageously employed in the preparation of the polyether polyol include simple alkylene oxides such as ethylene oxide, propylene oxide, butylene oxide, and amylene oxide; glycidyl ethers such as t-butyl glycidyl ether and phenyl glycidyl ether; and random or block copolymers of two or more of these oxiranes. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have primary, secondary of tertiary hydroxyl groups and, preferably, are polyethers prepared from alkylene oxides having from two to six carbon atoms such as ethylene oxide, propylene oxide and butylene oxide. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951), or in U.S. Pat. No. 1,922,459. Also suitable are polyether polyols and processes for preparing them that are described in Schick, M. J., *Nonionic Surfactants*, Marcel Dekker, Inc., New York (1967), U.S. Pat. Nos. 2,891,073; 3,058,921; 2,871,219 and British Pat. No. 898,306. Polyether polyols which are most preferred include the alkylene oxide addition products of water, trimethylolpropane, glycerine, pentaerythritol, sucrose, sorbitol, propylene glycol and blends thereof having hydroxyl equivalent weights of from about 250 to about 5000.

Suitable polyhydric thioethers which are sometimes advantageously condensed with alkylene oxides include the reaction product of thiodiglycol with alkylene oxides or dihydric alcohols such as disclosed above.

Polyhydroxyl-containing phosphorus compounds which are optionally used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Polyacetals (acetal resins) which are optionally reacted with alkylene oxides or other oxiranes include the reaction product of formaldehyde or other suitable aldehyde with a polyhydric alcohol or an oxirane such as those disclosed above. Polyacetals derived from acetone or from cyclic acetals are also suitably employed.

Aliphatic and aromatic thiols which are optionally reacted with alkylene oxides and other oxiranes include alkane thiols such as 1,2-ethane dithiol, 1,2-propane dithiol and 1,6-hexane dithiol; alkene thiols such as 2-butene-1,4-dithiol; and alkyne thiols such as 3-hexyne-1,6-dithiol; and arene thiols such as 1,4-benzene dithiol. Other thiols suitable for this purpose are hydrogen sulfide as well as thio functional polymers such as polyvinylbenzyl thiol.

Acids and amides which are optionally reacted with alkylene oxides and other oxiranes include difuntional fatty acids such as hydroxystearic and dihydroxystearic acid as well as amides such as fatty acid alkanol amides, e.g., lauroyl monoethanolamide; diacids such as adipic and terephthalic acid; sulfonamides and other acids and amides set forth in Schick, supra.

Amines which are optionally reacted with alkylene oxides and other oxiranes include aromatic amines such as aniline, o-chloroaniline, p-amino aniline, 1,5-diamino naphthalene, methylene dianiline, the condensation products of aniline and formaldehyde and 2,4-diamino toluene; aliphatic amines such as methylamine, triisopropanolamine, isopropanolamine, diisopropanolamine, ethylenediamine, 1,3-propylenediamine, 1,4-butylenediamine and 1,3-butylenediamine, mixtures thereof and the like.

Additional polyethers and methods for their preparation are set forth in Schick, supra.

Examples of suitable hydroxyl-containing polyesters include those obtained from polycarboxylic acids and polyhydric alcohols. Examples of suitable polycarboxylic acids include oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexane-dicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, α-methyl glucoside, pentaerythritol and sorbitol. Also included with the term "polyhydric aclohol" are compounds derived from phenols such as 2,2-(4,4'-hydroxyphenyl)propane, commonly known as bisphenol A, bis(4,4'-hydroxyphenyl)sulfide and bis(4,4'-hydroxyphenyl)sulfone.

Other non-thiacyclic polyahls suitably employed include polyacetones; hydroxy functional acrylic polymers such as polymers of hydroxyethyl acrylate and hydroxypropyl acrylate; polyvinyl acetate and other polymers of vinyl acetate and other ethylenically unsaturated carboxylic acids; hydroxyl-containing epoxy resins; urea-formaldehyde and melamine-formaldehyde resins; hydroxyl-containing polycarbonates and polyurethanes; methylol resins; starches and other cellulosic polymers; esters of phosphoric, sulfonic, sulfuric and boric acid; and polypeptides.

In addition, the non-thiacyclic polyahl suitably contains a copolymer dispersed therein (often such dispersions are called copolymer polyols), e.g., copolymer polyols described in (U.S. Pat. No. Re 29118, U.S. Pat. No. Re 29014 and U.S. Pat. No. 4,390,645.

Organic polyisocyanates which may be employed include aromatic, aliphatic and cycloaliphatic polyisocyanates and combinations thereof. Representative of these types are the diisocyanates such as m-phenylene diisocyanate, tolylene-2,4-diisocyanate, tolylene-2,6-diisocyanate, hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; the triisocyanates such as 4,4',4'-triphenylmethane triisocyanate, polymethylene polyphenylisocyanate and tolylene-2,4,6-triisocyanate; and the tetraisocyanates such as 4,4'-dimethyldiphenylmethane-2,2',5,5'-tetraisocyanate. Especially useful due to their availability and properties are tolylene diisocyanate, diphenylmethane-4,4'-diisocyanate and polymethylene polyphenylisocyanate.

Crude polyisocyanates may also be used in the practice of the present invention, such as crude toluene diisocyanate obtained by the phosgenation of a mixture of toluenediamines or crude diphenylmethylene diisocyanate obtained by the phosgenation of crude diphenylmethylenediamine. The preferred undistilled or crude isocyanates are disclosed in U.S. Pat. No. 3,215,652.

The chain extender employed in the practice of this invention is a thiapolycyclic polyahl, preferably a thiapolycyclic polyamine, most preferably a thiabicyclic diamine. For the purposes of this invention, a thiapolycyclic polyahl is an aliphatic compound having (1) a bridge system of at least two rings, (2) a sulfur-containing bridging group, and (3) at least two active hydrogen moieties bonded to carbons other than bridgehead carbons. The active hydrogen moiety suitable for this purpose is as defined hereinbefore. Advantageously, the active hydrogen moieties are bonded to the same or different non-sulfur bridging groups. In addition, it is desirable that at least one and preferably two of the non-sulfur bridging groups bear a pendant lower alkyl moiety such as methyl, ethyl or propyl, preferably methyl. Representative preferred thiapolycyclic polyahls include those having the formula:

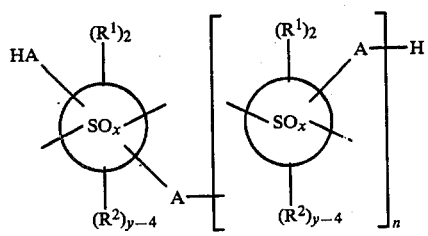

wherein A is a residue of an active hydrogen moiety such as $-O-$, $-S-$, $-NR^3-$,

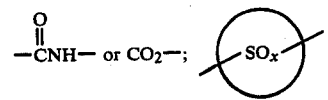

is a thiapolycyclic moiety having at least 6 carbons and a sulfur-containing bridging group and x is 0, 1 or 2; each $R^1$ is independently an alkyl group containing 1 to 3 carbon atoms; each $R^2$ is independently hydrogen or methyl provided that at least two $R^2$ are hydrogen; y is a number corresponding to available valences for the polycyclic ring; each $R^3$ is independently hydrogen, an aliphatic alkyl containing 1 to 20 carbon atoms or an inertly-substituted aliphatic alkyl containing 1 to 20 carbon atoms, with hydrogen being preferred; and n is 0, 1, 2 or 3. By "inert", it is meant that the substituent group will not react with amine group or other group of the thiabicyclic compound, e.g., alkyl or alkoxy.

Alternatively, the thiapolycyclic polyahl includes compounds represented by the formula:

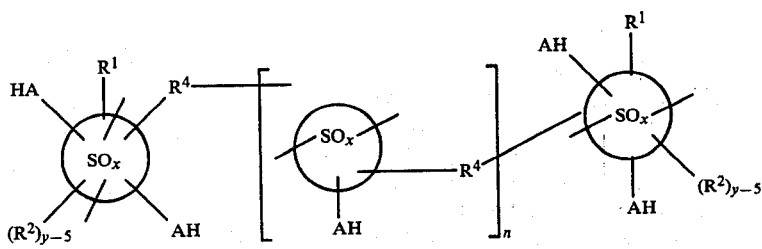

wherein $R^1$, $R^2$, x, y, n and A are as defined hereinbefore and $R^4$ is a divalent radical such as alkylene, e.g., ethylene, propylene or butylene. Preferably, in both of the aforementioned formulas, AH is an amino moiety represented by $-NR^3H$.

Representative of the most preferred thiapolycyclic diamines are those represented by the formulas:

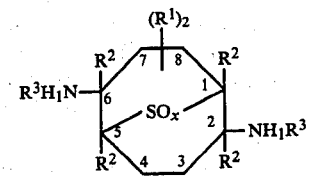

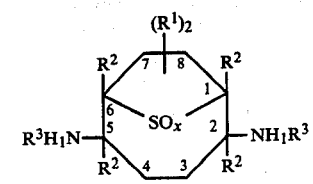

wherein each $R^1$, $R^2$, $R^3$ and x are as defined hereinbefore. Preferably, $R^3$ is hydrogen. Examples of such preferred thiabicyclic diamines are dialkyl-9-thiabicyclononane diamine isomers and N-alkyl diamine derivatives thereof such as 2-endo-6-endo-2,6-diamino-4-endo-8-exo-4,8-dimethyl-9-thiabicyclo[3.3.1]nonane; 2-endo-6-endo-2,6-diamino-4-exo-8-exo-4,8-dimethyl-9-thiabicyclo[3.3.1]nonane; 2-endo-6-endo-2,6-diamino-4-endo-8-endo-4,8-dimethyl-9-thiabicyclo[3.3.1]nonane;

2-endo-6-endo-2,6-diamino-3-endo-7-endo-3,7-dimethyl-9-thiabicyclo[3.3.1]nonane; 2-endo-6-endo-2,6-diamino-3-exo-7-exo-3,7-dimethylthiabicyclo[3.3.1]nonane; 2-endo-6-endo-2,6-diamino-3-endo-7-exo-3,7-dimethyl-9-thiabicyclo[3.3.1]nonane; 2-endo-6-endo-2,6-diamino-3-exo-4-exo-3,4-dimethyl-9-thiabicyclo[3.3.1]nonane; 2-endo-6-endo-2,6-diamino-3-endo-4-exo-3,4-dimethyl-9-thiabicyclo[3.3.1]nonane; 2-endo-6-endo-2,6-diamino-3-exo-4-endo-3,4-dimethyl-9-thiabicyclo[3.3.1]nonane; 2-endo-6-endo-2,6-diamino-3-endo-4-endo-3,4-dimethyl-9-thiabicyclo[3.3.1]nonane; 2-endo-5-endo-2,5-diamino-7-endo-8-endo-7,8-dimethyl-9-thiabicyclo[4.2.1]nonane; 2-endo-6-endo-2,6-diamino-7-exo-1,7-dimethyl-9-thiabicyclo[3.3.1]nonane; 2-endo-6-endo-2,6-diamino-7-endo-1,7-dimethyl-9-thiabicyclo[3.3.1]nonane; 2-endo-6-endo-2,6-diamino-4-exo-1,4-dimethyl-9-thiabicyclo[3.3.1]nonane; 2-endo-6-endo-2,6-diamino-4-endo-1,4-dimethyl-9-thiabicyclo[3.3.1]nonane; 2-endo-5-endo-2,5-diamino-7-endo-1,7-dimethyl-9-thiabicyclo[3.3.1]nonane; and the N-alkyl derivatives of such diamines where the N-alkyl can be methyl, ethyl, isopropyl and the like, with mixtures of two or more such isomers being especially preferred.

Other isomers which are desirable include 2-endo-5-endo-2,5-diamino-7-exo-8-exo-7,8-dimethyl-9-thiabicyclo[4.2.1]nonane; 2-endo-5-endo-2,5-diamino-7-endo-8-exo-7,8-dimethyl-9-thiabicyclo[4.2.1]nonane; 2-endo-5-endo-2,5-diamino-3-exo-4-exo-3,4-dimethyl-9-thiabicyclo[4.2.1]nonane; 2-endo-5-endo-2,5-diamino-3-endo-4-endo-3,4-dimethyl-9-thiabicyclo[4.2.1]nonane; 2-endo-5-endo-2,5-diamino-3-endo-4-exo-3,4-dimethyl-9-thiabicyclo[4.2.1]nonane; 2-endo-5-endo-2,5-diamino-3-endo-7-exo-3,7-dimethyl-9-thiabicyclo[4.2.1]nonane; 2-endo-5-endo-2,5-diamino-3-endo-7-endo-3,7-dimethyl-9-thiabicyclo[4.2.1]nonane; 2-endo-5-endo-2,5-diamino-3-endo-7-exo-3,7-dimethyl-9-thiabicyclo[4.2.1]nonane; 2-endo-5-endo-2,5-diamino-3-exo-7-endo-3,7-dimethyl-9-thiabicyclo[4.2.1]nonane; 2-endo-6-endo-2,6-diamino-2-exo-7-exo-2,7-dimethyl-9-thiabicyclo[3.3.1]nonane; 2-endo-6-endo-2,6-diamino-2-exo-7-endo-2,7-dimethyl-9-thiabicyclo[3.3.1]nonane; 2-endo-6-endo-2,6-diamino-2-exo-4-exo-2,4-dimethyl-9-thiabicyclo[3.3.1]nonane; 2-endo-6-endo-2,6-diamino-2-exo-4-endo-2,4-dimethyl-9-thiabicyclo[3.3.1]nonane; 2-endo-5-endo-2,5-diamino-2-exo-4-exo-2,4-dimethyl-9-thiabicyclo[4.2.1]nonane; 2-endo-5-endo-2,5-diamino-2-exo-4-endo-2,4-dimethyl-9-thiabicyclo[4.2.1]nonane; 2-endo-5-endo-2,5-diamino-2-exo-7-exo-2,7-dimethyl-9-thiabicyclo[4.2.1]nonane; 2-endo-5-endo-2,5-diamino-2-exo-7-endo-2,7-dimethyl-9-thiabicyclo[4.2.1]nonane; 2-endo-5-endo-2,5-diamino-4-exo-1,4-dimethyl-9-thiabicyclo[3.3.1]nonane; 2-endo-5-endo-2,5-diamino-4-endo-1,4-diamino-9-thiabicyclo[3.3.1]nonane; and 2-endo-5-endo-2,5-diamino-7-exo-1,7-dimethyl-9-thiabicyclo[3.3.1]nonane.

The preferred thiabicyclic diamines are advantageously prepared by reacting an aliphatic diene such as piperylene or 1,3-pentadiene; 1,3-hexadiene; 1,3-heptadiene; and/or 5-methyl-1,3-hexadiene via cyclodimerization to form a cyclic octadiene having the structure:

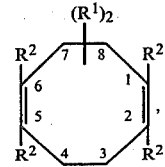

wherein $R^1$ and $R^2$ are as defined before. Alternatively, butadiene or isoprene can be cross-dimerized with piperylene or any of the other aforementioned dienes to produce the cyclic octadiene, or any two of said aforementioned dienes can be cross-dimerized to produce the desired cyclic octadiene.

Such cyclodimerization of a diene is known as taught by J. A. Berson et al., *JACS*, 98 (19), pp. 5937–68 (1976) (Chem. Abstr. 86:70,9559); and U. M. Dzhemilev et al., *Neftekhimiya*, 15 (6), pp. 819–24 (1975) (Chem. Abstr. 84:121,2456); all of which are incorporated herein by reference.

The cyclooctadienes may be converted to a thiabicyclic dichloride by the reaction of the cyclooctadiene with sulfur dichloride as disclosed in Weil et al. in *J. Org. Chem.*, 31 (6), pp 1669–1679 (1966); or Corey et al. in *J. Org. Chem.*, 31 (6), pp. 1663–1668 (1966); or Tolstikov et al. in *Zh. Org. Khim.*, 16 (7), pp. 1408–1418 (1980); or British Pat. Nos. 1,061,472 and 1,061,473; all of which are incorporated herein by reference.

Such dichlorides are represented by the formulae:

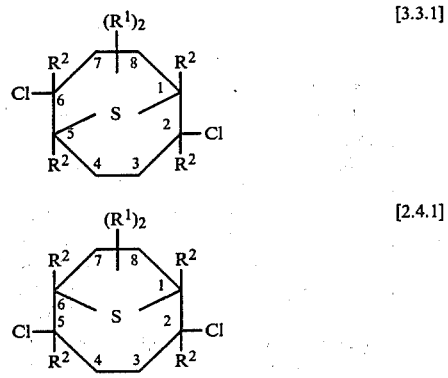

wherein the $R^1$ and $R^2$ groups are as defined before and the $R^1$ groups are connected to the 3, 4, 7 or 8 ring carbons, but not the carbons directly attached to either the sulfur or chlorine atoms (1, 2, 5, 6). Either or both of the [3.3.1] and [4.2.1] structures are found in the product as it has been found that the two structures are interconvertible during any reaction, even by merely dissolving in an ionizing solvent.

The dichloride is converted to the diamine using conventional procedures by contacting the dichloride with ammonia or a primary amine $R^3NH_2$ wherein $R^3$ is hydrogen, an aliphatic alkyl group containing 1–20 carbon atoms or an inertly-substituted aliphatic alkyl group containing 1–20 carbon atoms as $R^3$ is defined hereinbefore.

The sulfoxide or sulfone, where x is 1 or 2, respectively, is prepared by the oxidation of the diamine using oxidizing agents such as hydrogen peroxide and perbenzoic acid.

Further detailed discussion of the preparation of such diamines including the sulfoxides and sulfones appears in U.S. patent application Ser. No. 454,134, filed Dec. 29, 1982.

Thiapolycyclic polyahls other than polyamines are prepared by similar techniques using the dichloride except that other reactants are substituted for the ammonia or amine. For example, in the preparation of the corresponding diol, the aforementioned dichloride is first reacted with potassium acetate and glacial acetic acid to form the corresponding bisacetate which is reacted with sodium methoxide in methanol to form the diol using conventional procedures for converting dichloride to diols. In the preparation of the corresponding dithiol, the aforementioned dichloride is first reacted with thiourea in ethanol and water using conventional procedures. To this reaction mixture is added an aqueous solution of sodium hydroxide. The reaction mixture is heated at reflux, cooled and treated with hydrochloric acid and chloroform. The organic phase containing the desired dithiol is separated from the aqueous phase and the dithiol is recovered.

The urethane reaction of polyisocyanate with non-thiacyclic polyahl in the presence of the thiapolycyclic polyahl chain extender is advantageously practiced in the presence of an amount of urethane catalyst which is effective to catalyze the reaction of the polyahl with the polyisocyanate. Preferably, the amount of urethane catalyst is an amount comparable to that used in conventional urethane type reactions, e.g., from about 0.05 to about 5, most preferably from about 0.1 to about 3, weight percent of the catalyst based on the weight of non-thiacyclic polyahl.

Any suitable urethane catalyst may be used including tertiary amines such as, for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropylamine, N,N-dimethyl-N',N'-methyl isopropyl propylenediamine, N,N-diethyl-3-diethylaminopropylamine, dimethyl benzylamine and the like. Other suitable catalysts are, for example, tin compounds such as stannous chloride, tin salts of carboxylic acids such as dibutyltin di-2-ethyl hexanoate and dibutyltin dilaurate, as well as other organometallic compounds such as are disclosed in U.S. Pat. No. 2,846,408.

The relative proportions of polyisocyanate to non-thiacyclic polyahl are those conventionally employed in the preparation of polyurethanes, preferably in proportions sufficient to provide isocyanate to active hydrogen equivalent ratios in the range from about 0.8:1 to about 1.5:1, most preferably from about 0.95:1 to about 1.1:1. The proportion of the thiapolycyclic polyahl employed is that which is sufficient to improve mechanical and/or thermal properties of the polyurethane. Preferably, it is used in an amount sufficient to improve processability of the polyurethane system. More preferably, the amount of thiapolycyclic polyahl chain extending agent is in the range from about 0.1 to about 50, most preferably from about 3 to about 25, weight percent of the chain extending agent based on the total weight of the non-thiacyclic polyahl. The urethane catalyst is employed in amounts sufficient to catalyze the urethane reaction, preferably in amounts from about 0.05 to about 5, most preferably from about 0.1 to about 3, part of catalyst per hundred parts of non-thiapolycyclic polyahl.

In addition to the foregoing components, it is understood that the polyurethane formulations of the present invention may also contain suitable amounts of conventional additives such as blowing agents, fillers, surfactants and other additives as such are described in U.S. Pat. No. 4,269,945, which is hereby incorporated by reference in its entirety.

The following examples are given to illustrate the present invention and are not to be construed as limiting the scope thereof in any manner. All parts and percentages are by weight unless otherwise indicated.

EXAMPLE 1

Into the polyol side tank of a reaction injection molding machine are added 5,358 g (1.09 moles) of a glycerin-initiated polyalkylene polyol made from propylene oxide with sufficient ethylene oxide terminal groups (caps) to yield 80 percent of primary hydroxyl based on the total number of hydroxyl and having a weight average molecular weight ($M_w$) of 4800-5000 (polyol I), 2,153 g (34.7 moles) of ethylene glycol, 375 g (1.87 moles) of a mixture of diamine isomers of dimethyl-9-thiabicyclononane and 12.1 g (0.019 mole) of dibutyltin dilaurate (urethane catalyst). These ingredients are mechanically agitated and heated to 100° F. To the isocyanate tank of the reaction injection molding machine is added 9.47 liters (11.55 kg, 40.11 moles) of diphenylmethane diisocyanate and then agitated and heated to 100° F. Specific gravities of the ingredients in each side tank of the reaction injection molding machine are 1.22 g/ml in the isocyanate tank and 1.04 g/ml in the polyol tank. The mixing pressure used for impingement is 1500 psi and the ingredients are shot into the mold using approximately a 0.65 lb shot size and a 40 lb/min throughput. The temperature of the mold is 155° F. and the in-mold time for each shot of material is 2 minutes. The dimensions of the mold cavity are 25.4×25.4×0.32 cm. Upon removal from the mold, the resulting molded article is placed in an oven at 150° C. for a post-cure of 30 or 60 minutes as indicated in the following Table I. The molded material is then tested for physical properties.

For purposes of comparison, several additional formulations are prepared using different concentrations of various ingredients such as concentration of diamine chain extender and the like. The resultant molded articles are similarly tested for physical properties and the results are reported in the following Table I.

Also for comparison, a conventional formulation is prepared using the foregoing ingredients except that an amine capped propylene oxide polymer represented by the structure

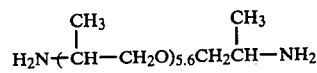

is substituted for the diamine chain extender of the present invention. This control formulation is similarly processed and tested for physical properties and the results are reported in Table I.

TABLE I

| Sample No. | Diamine Extender[1] | | | Cure Time, min. | Tensile[2], psi | | Flexural[3], psi | | Izod[4] ft-lb/in | Heat Sag[5] | |
|---|---|---|---|---|---|---|---|---|---|---|---|
| | Type | % | Equiv. | | Strength | Modules | Strength | Modules | | 6 in | 4 in |
| 1 | A | 6.5 | 3.74 | 60 | 3,340 | 95,000 | 4,495 | 110,000 | 1.45 | 0.906 | 0.118 |
| 2 | A | 3.4 | 2.07 | 60 | 3,960 | 105,000 | 4,630 | 118,000 | 1.55 | 0.35 | 0.06 |
| 3 | B | 4.8 | 2.17 | 60 | 3,970 | 110,000 | 4,631 | 110,000 | 2.26 | 0.76 | 0.24 |
| 4 | B | 6.5 | 2.98 | 60 | 4,167 | 110,000 | 5,264 | 120,000 | 2.61 | 1.25 | 0.17 |
| 5 | B | 9.2 | 3.74 | 60 | 3,977 | 100,000 | 5,200 | 120,000 | 2.40 | 0.94 | 0.16 |
| C* | C | 6.5 | 2.10 | 45 | 3,310 | 85,000 | 4,250 | 110,000 | 2.63 | 1.72 | 0.37 |

*Not an example of the invention.
[1]A — dimethyl-9-thiabicyclononane diamine (a mixture of isomers).
B — diisopropylamine derivative of 2,6-dichloro-9-thiabicyclo[3.3.1]nonane represented by the structure

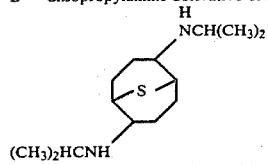

C — amine capped propylene oxide polymer as defined hereinbefore.
% based on polyol weight, equivalent of amine.
[2]ASTM D 638
[3]ASTM D 790
[4]ASTM D 265
[5]ASTM D 3769-81 (30 min at 325° F.)

As evidenced by the data shown in Table I, the polyurethane prepared by the practice of the present invention (Sample Nos. 1-5) exhibit substantially less heat sag at 6 inches than do polyurethanes using conventional polyamine chain extenders.

What is claimed is:

1. A reaction injection molding composition comprising a non-thiacyclic polyahl, thiapolycyclic polyahl, an organic polyisocyanate and a urethane catalyst in proportions such that, upon subjecting the composition to conditions of a reaction injection molding process, a useful reaction injection molded article is formed.

2. The composition of claim 1 wherein the non-thiacyclic polyahl is a polyol and the thiapolycyclic polyahl is a thiapolycyclic polyamine.

3. The composition of claim 1 wherein the thiapolycyclic polyahl is represented by the structural formula:

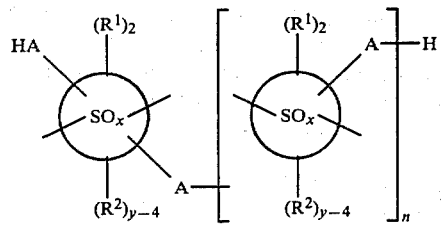

wherein A is a residue of an active hydrogen moiety such as —O—, —S—, —NR³—,

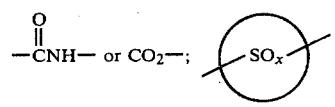

is a thiapolycyclic moiety having at least 6 carbons and a sulfur-containing bridging group and x is 0, 1 or 2; each $R^1$ is independently an alkyl group containing 1 to 3 carbon atoms; each $R^2$ is independently hydrogen or methyl provided that at least two $R^2$ are hydrogen; y is a number corresponding to available valences for the polycyclic ring; each $R^3$ is independently hydrogen, an aliphatic alkyl containing 1 to 20 carbon atoms or an inertly-substituted aliphatic alkyl containing 1 to 20 carbon atoms; and n is 0, 1, 2 or 3.

4. The composition of claim 1 wherein the thiapolycyclic polyahl is represented by one of the structural formulas:

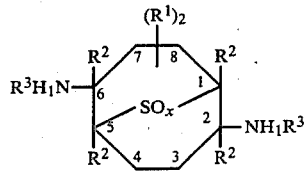

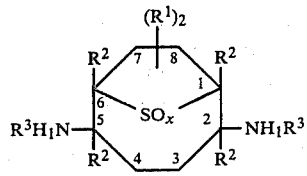

5. The composition of claim 2 wherein the thiapolycyclic polyamine is a mixture of dialkyl-9-thiabicyclononane diamine isomers.

6. The composition of claim 5 wherein the polyol is a polyalkylene ether polyol.

7. The composition of claim 6 wherein the polyisocyanate is an aromatic polyisocyanate.

8. The composition of claim 7 which (1) contains from about 0.1 to about 50 weight percent of the diamine based on the polyol and from about 0.05 to about 5 weight percent of the urethane catalyst based on the polyol and wherein (2) the ratio of polyisocyanate to the polyol is sufficient to provide from about 0.8:1 to about 1.5:1 of isocyanate equivalents to hydroxyl equivalents in the polyol.

9. A process for making reaction injection molded polyurethanes which comprises subjecting in a one-shot procedure the composition of claim 1 to conditions sufficient to form a reaction injection molded article.

10. A process for making reaction injection molded polyurethanes which comprises subjecting in a one-shot procedure the composition of claim 4 to conditions sufficient to form a reaction injection molded article.

11. A process for making reaction injection molded polyurethanes which comprises subjecting in a one-shot procedure the composition of claim 8 to conditions sufficient to form a reaction injection molded article.

12. A reaction injection molded article prepared from the composition of claim 1.

13. A reaction injection molded article prepared from the composition of claim 4.

14. A reaction injection molded article prepared from the composition of claim 8.

15. The composition of claim 4 wherein X is 0, each $R^1$ is methyl and each $R^2$ is hydrogen.

16. The composition of claim 15 wherein each $R^3$ is hydrogen.

17. The composition of claim 15 which is a mixture of isomers of the diamine.

18. The composition of claim 16 which is a mixture of isomers of the diamine.

19. The composition of claim 17 wherein the non-thiacyclic polyahl is a polyol.

20. The composition of claim 19 wherein the polyol is a polyalkylene ether polyol and the polyisocyanate is an aromatic diisocyanate.

* * * * *